July 25, 1950 H. L. KRAEFT ET AL 2,516,705
TRICYCLE FRAME STRUCTURE

Filed May 6, 1947 2 Sheets-Sheet 1

INVENTORS.
HERMAN L. KRAEFT
VIKTOR SCHRECKENGOST
BY Fay, Golrick & Fay
ATTORNEYS

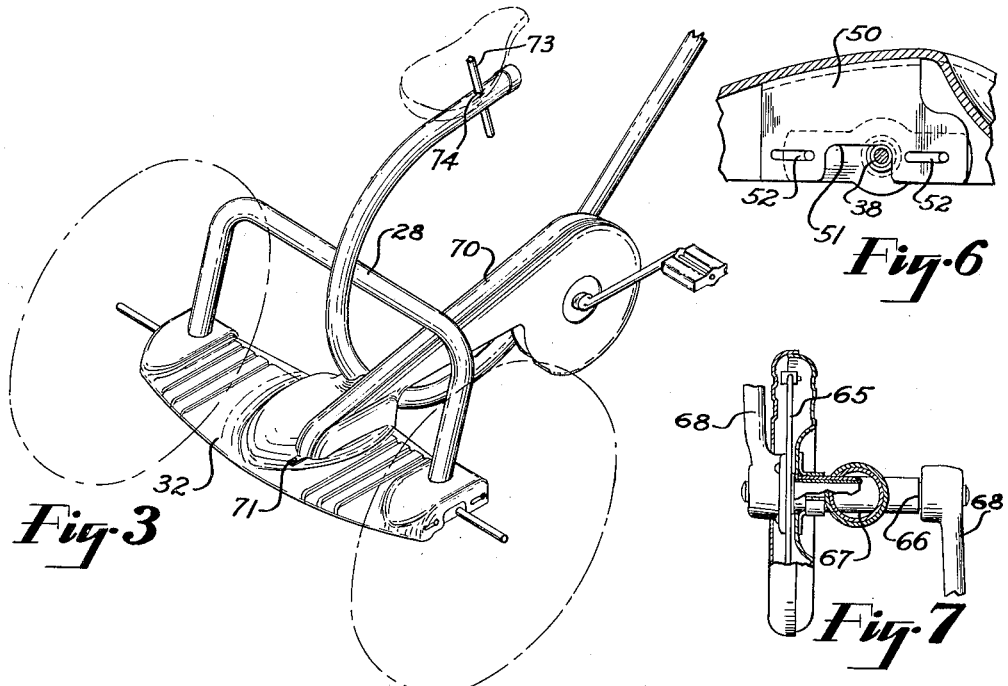
Fig·3
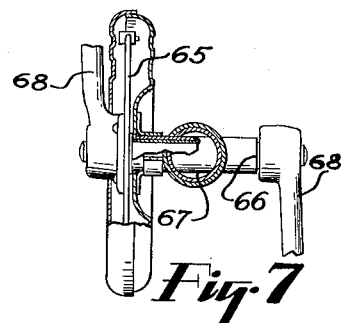
Fig·6
Fig·7
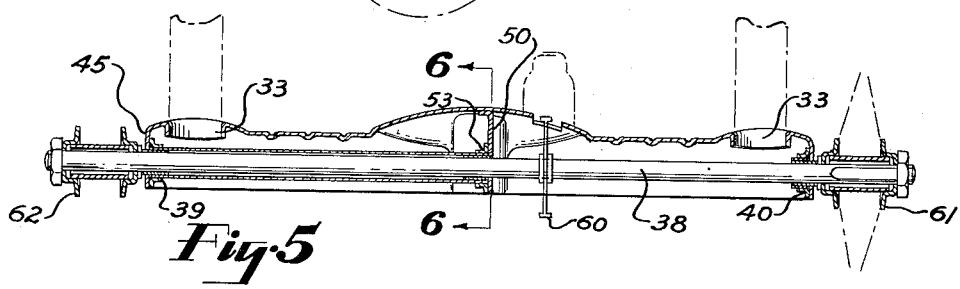
Fig·5
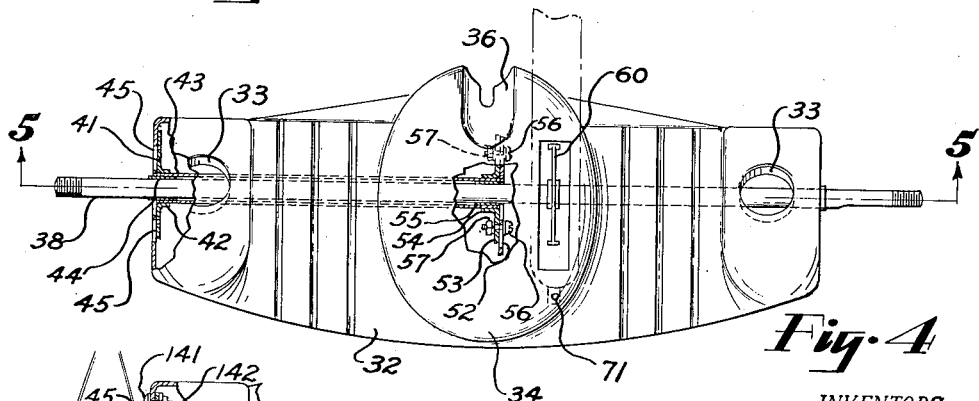
Fig·4
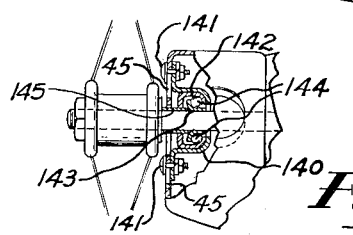
Fig·8
INVENTORS.
HERMAN L. KRAEFT
VIKTOR SCHRECKENGOST
BY Fay, Golrick & Fay
ATTORNEYS Patented July 25, 1950

2,516,705

UNITED STATES PATENT OFFICE 2,516,705

TRICYCLE FRAME STRUCTURE

Herman L. Kraeft and Viktor Schreckengost, Cleveland Heights, Ohio, assignors to The Murray-Ohio Manufacturing Company, Cleveland, Ohio, a corporation of Ohio Application May 6, 1947, Serial No. 746,246

4 Claims. (Cl. 280—282)

The present invention relates to a wheeled vehicle driven through a pedal and sprocket mechanism, and more particularly it relates to a novel frame for a tricycle.

An object of the present invention is to provide a tricycle, or similar wheeled vehicle, in which the frame thereof is formed of parts which can be readily assembled into a so-called "boy's" type tricycle or into a so-called "girl's" type tricycle.

A further object of the invention is to provide a sturdy and lightweight tricycle frame which is made of relatively few, easily formed members.

Other objects and advantages of the invention will be apparent from the following description of a preferred form of embodiment of the invention, reference being made to the accompanying drawings wherein:

Fig. 3 is a fragmentary, perspective view of the tricycle shown in Fig. 1;

Fig. 4 is a top view of a part of the rear wheel assembly of the tricycle shown in Fig. 3;

Fig. 5 is a view in section taken on line 5—5 of Fig. 4;

Fig. 6 is a fragmentary view in section taken on line 6—6 of Fig. 5, but on a larger scale;

Fig. 7 is a view taken substantially along line 7—7 of Fig. 1;

Fig. 8 is a fragmentary view, partly broken away, of another form of rear wheel assembly, which is somewhat similar to that shown in Fig. 4; and, Fig. 9 is a view taken along line 9—9 of Fig. 2.

Figure 1:
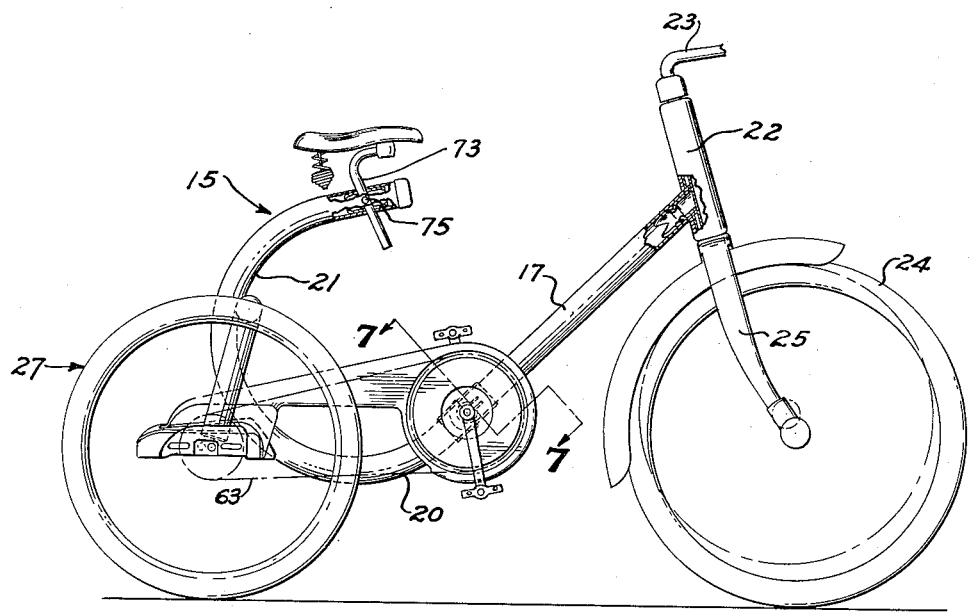
Fig. 1 is a side view in elevation of one form of tricycle, certain parts being broken away.
Figure 2:
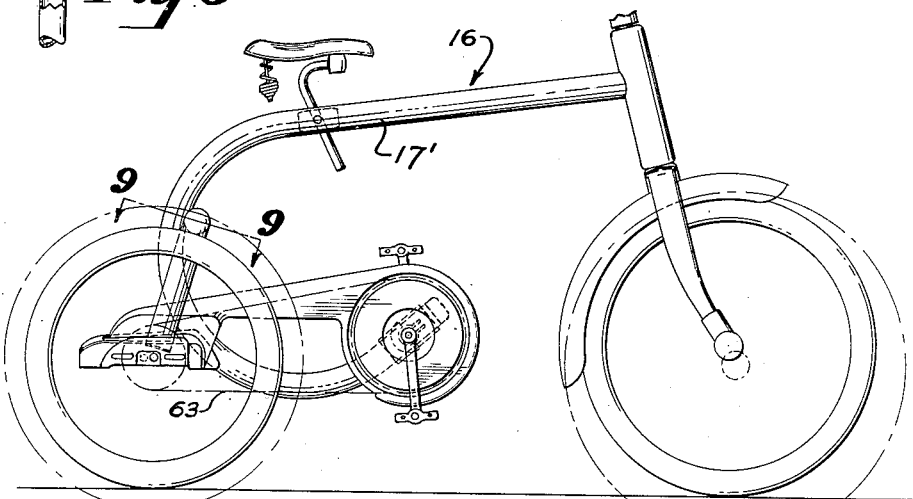
Fig. 2 is a side view in elevation of a second form of tricycle.

Although it is to be understood that the invention could be embodied in other types of vehicles than tricycles, for the purposes of illustrating the invention I have shown a girl's type tricycle 15 in Figs. 1 and 3. A boy's type tricycle is shown at 16 in Fig. 2, and the difference between these two vehicles is that in the former type the reach bar 17 extends rearwardly and downwardly from the front of the vehicle while in the latter type the reach bar 17' extends rearwardly and substantially horizontal to the ground.

Referring now to the tricycle indicated generally at 15, this tricycle comprises a main frame member 20 which preferably consists of a tube having a straight section indicated at 17 and a semi-circular section indicated at 21. One end of the straight section 17 is attached to the vertical post of the front wheel assembly 22. The method of attachment is not material to my invention, and for example, it may be brazed to the assembly. The front wheel assembly includes handle bars 23 and a front wheel 24 supported by a fork member 25 which may be turned by the handle bars 23.

Figure 9:
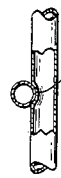

A rear wheel assembly 27 is attached to the rear part of the frame member 20 at the semi-circular section of the frame. The rear wheel assembly consists of an inverted U-shaped yoke 28, which is preferably formed of a tube, and the central part of the tube is crushed to form a relatively extensive contact surface with the frame member 20, as may be seen at 29 in Fig. 9. Preferably, the tube 28 is attached to the frame section 21 by brazing. A plate 32, which may be formed of a metal stamping is attached to the lower ends of the legs of the yoke 28, the connection being made by the formation of cylindrical openings 33 through the plate, which openings receive the ends of the legs of the yoke and to the walls of which openings the legs are brazed. The central portion of the plate 32 is raised as at 34 and a groove-like depression 36 is formed in the forward portion of the raised part 34 and the bottom surface of the depression 36 is arcuate longitudinally so that the semi-circular section 21 of frame 20 will rest in and be supported by the walls forming the depression 36. Preferably, the frame 20 is brazed to the walls of the depression 36 so that a sturdy and rigid connection is formed between the frame and the rear wheel assembly.

The plate 32 is adapted to support the rear axle 38, and for this purpose bearings 39 and 40 are attached in the down turned ends of the plate 32. The bearing 39 consists of a plate 41 having a neck portion 42 extending therefrom. One end of a sleeve 43, which surrounds a portion of the axle, is secured in the neck portion 42 and a bearing sleeve 44 is interposed between the sleeve and the axle. The end wall of the plate 32 to which the bearing 39 is attached is slotted on opposite sides of the axle as indicated at 45 and bolts 46 extend through the respective slots and the plate 41. By tightening nuts 47 on the bolts the bearing 39 can be adjustably positioned rearwardly or forwardly on the plate 32. The bearing 40 is similar to the bearing 39, the only difference being that sleeve 43 is omitted. The position of the bearing 40 relative to the plate 32 may be adjusted in the same manner as described with reference to the bearing 39. A bearing hanger plate 50 is attached to the wall of the raised portion 34 and the hanger plate is provided with an offset 51 through which the axle 38 may extend, and on opposite sides of the offset slots 52 are provided so that a bushing plate 53 can be adjustably attached to the hanger plate 50. The bushing plate 53 includes a neck-like opening 54 in which the opposite end of the sleeve 43 is attached and a bearing sleeve 55 is interposed between the axle and the sleeve. Bolts 56 extend through the slots 52 and nuts 57 on the bolts attach the bushing plate to the hanger plate 50. It will be seen by this construction the axle 38 may be positioned forwardly or rearwardly as desired, the purpose of which will appear hereinafter.

Another form of bearing which may be used instead of 39 and 40 is illustrated in Fig. 8 in which a roller bearing housing 140 is attached to the end wall of plate 32 by bolts 141 extending through the slots 45 of the plate. An outer ball race member 142 is attached to housing 140 and an inner ball race member 143 is concentrically arranged relative to the outer race and balls 144 are interposed between the races. A sleeve 145 retains the inner race in position.

A sprocket 60 is keyed to the axle 38, and a rear drive wheel 61 is keyed to the axle 38. The other rear wheel 62 is adapted to rotate freely on the axle.

The sprocket 60 is adapted to be driven by a chain 63 which is driven by a sprocket 65 supported on the frame 20 at the portion of the frame adjacent to the beginning of the semi-circular section 21. The sprocket 65 is mounted on a shaft 66 which extends through the frame 20. The shaft 66 is mounted in a bearing sleeve 67 which is brazed in an opening through the frame member 20, and foot pedal members 68 are threaded on the ends of the shaft 66. The sprocket 65 is riveted to the hub of one of the pedals 68. The chain may be tightened or loosened by adjusting axle 38 rearwardly or forwardly, respectively, as described.

The upper part of the sprocket 60, the sprocket 65 and the upper reach of the chain are covered by a shield 70, which shield is supported on the sleeve 67 at one end and attached to the plate 32 at the opposite end by a screw 71.

A seat post 73 extends through an opening 74 through the frame 20 adjacent the end thereof and the vertical position of the seat post may be adjusted by a set screw 75.

Referring now to the boy's type tricycle 16, it will be seen that this tricycle is formed in the same manner as the tricycle 15 except that the frame 20 is inverted and the seat post 73 is attached to the frame 20 approximately at the juncture of the straight section and the curved section while the sprocket 65 is mounted to the frame adjacent to the end of the curved section.

It will be seen that by my invention two distinct types of tricycles may be formed by using similar parts and merely reversing the position of the frame. Thus, there is considerable advantage in saving of material and manufacturing costs in constructing the two types of tricycles. Furthermore, the structure shown is exceedingly sturdy although it is formed of a minimum of parts that are readily formed.

Although we have described but two forms of the invention other forms might be adopted, all falling within the scope of the claims which follow.

We claim:

1. A wheeled vehicle comprising a frame consisting of an elongated tubular member having a substantially straight section and a substantially semi-circular section at one end of the straight section, one end of said frame member forming the terminus of the semi-circular section; a front wheel assembly attached to the other end of the straight section; and a rear wheel assembly attached to the semi-circular section of the member for supporting the frame with the semi-circular section in a vertical plane, said rear wheel assembly comprising, an inverted U-shaped tubular member extending transversely of the plane of said semi-circular section exteriorly thereof, a rigid sheet metal plate interconnecting the lower ends of the U-shaped member, said plate having a centrally disposed longitudinally arcuate depression adapted to tangentially receive a portion of the lower part of the semi-circular section of said frame member and thereby support the semi-circular section, and said U-shaped member being attached to the curved portion of said frame member above said plate.

2. A wheeled vehicle comprising a frame consisting of a tubular member having a substantially straight section and a substantially semi-circular section at one end of the straight section, one end of said frame member forming the terminus of the curved section; a front wheel assembly attached to the other end of the straight section; a rear wheel assembly attached to the semi-circular section of the member for supporting the frame with the semi-circular section in a vertical plane, said rear wheel assembly including an inverted U-shaped member attached to the frame and extending transversely of the frame; a plate interconnecting the lower ends of the U-shaped member and supporting an axle for the rear wheels; a drive sprocket on said frame comprising a bearing sleeve extending through a transverse opening in said tubular member and projecting beyond one side of said member; a crankshaft extending through said sleeve bearing; a sprocket mounted on the crankshaft; a sprocket mounted on said axle and in alignment with the drive sprocket, said plate having an opening through which the sprocket in the axle extends; and a housing connected to said one end of the sleeve bearing and enclosing the drive sprocket and extending rearwardly to said plate and enclosing the top of the sprocket on said axle.

3. A wheeled vehicle comprising, a frame consisting of an elongated tubular member having a substantially straight section and a substantially semi-circular section at one end of the straight section, one end of said frame member forming the terminus of the semi-circular section; a front wheel assembly attached to the other end of the straight section; and a rear wheel assembly attached to the semi-circular section of the member for supporting the tubular frame with the semi-circular section thereof in a vertical plane, said rear wheel assembly comprising, a single, inverted U-shaped tubular member extending transversely of the plane of said semi-circular section, a rear platform formed of sheet metal to comprise a cross member interconnecting the lower ends of the U-shaped tubular member and having a bearing portion formed to conform to the curvature of the tubular frame, and said U-shaped member being attached to the curved portion of said frame member above the cross member while extending exteriorly of the tubular frame member.

4. A wheeled vehicle comprising a frame consisting of an elongated tubular member having a substantially straight section and a substantially semi-circular section at one end of the straight section, one end of said tubular frame member forming the terminus of the semi-circular section; a front wheel assembly attached to the other end of the straight section, a rear wheel assembly attached to the semi-circular section of the tubular member for supporting the frame with the semi-circular section in a vertical plane, said rear wheel assembly comprising, an inverted U-shaped tubular member extending transversely of the plane of said semi-circular section in a continuous manner and tangentially attached to said section, a rigid sheet metal plate interconnecting the lower ends of the U-shaped member, a top portion of said plate being attached to a portion of the lower part of the semi-circular section of said frame member, said plate being adapted to support an adjustable chain driven axle and having a sprocket opening in the top thereof adjacent the vertical plane of the tubular frame member whereby a sprocket on the axle may extend upwardly through the opening.

HERMAN L. KRAEFT.
VIKTOR SCHRECKENGOST.

REFERENCES CITED

The following references are of record in the file of this patent:

UNITED STATES PATENTS

| Number | Name | Date |
|---|---|---|
| 506,194 | Hopkins | Oct. 3, 1893 |
| 589,205 | Cooper | Aug. 31, 1897 |
| 622,526 | Nies et al. | Apr. 4, 1899 |
| 671,478 | Grimme | Apr. 9, 1901 |
| 1,559,276 | Nelson | Oct. 27, 1925 |
| 1,713,999 | Davis | May 21, 1929 |
| 2,112,475 | Anderson | Mar. 29, 1938 |
| 2,181,413 | Anderson | Nov. 28, 1939 |
| 2,202,479 | Bullock | May 28, 1940 |